United States Patent
Popovici et al.

(10) Patent No.: US 9,361,198 B1
(45) Date of Patent: Jun. 7, 2016

(54) DETECTING COMPROMISED RESOURCES

(71) Applicant: Google Inc., Mountain View, CA (US)

(72) Inventors: Radu Popovici, Foster City, CA (US); Yi-An Huang, Fremont, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/715,191

(22) Filed: Dec. 14, 2012

Related U.S. Application Data

(60) Provisional application No. 61/570,802, filed on Dec. 14, 2011.

(51) Int. Cl.
G06F 17/30 (2006.01)
G06F 11/30 (2006.01)
G06F 21/56 (2013.01)
G06F 21/64 (2013.01)

(52) U.S. Cl.
CPC ............ *G06F 11/30* (2013.01); *G06F 21/56* (2013.01); *G06F 21/64* (2013.01)

(58) Field of Classification Search
CPC ......... G06F 11/30; G06F 21/56; G06F 21/64; G06F 2221/2119
USPC .............. 707/687, 690, 692, 694; 726/22, 25
See application file for complete search history.

(56) References Cited

U.S. PATENT DOCUMENTS

| 7,313,823 | B2 | 12/2007 | Gao | |
|---|---|---|---|---|
| 8,145,908 | B1 | 3/2012 | Liu et al. | |
| 8,286,239 | B1 * | 10/2012 | Sutton | 726/22 |
| 8,549,637 | B2 | 10/2013 | Alhamed et al. | |
| 2010/0042931 | A1 * | 2/2010 | Dixon et al. | 715/738 |
| 2010/0107247 | A1 * | 4/2010 | Shani | 726/22 |
| 2011/0072262 | A1 | 3/2011 | Amir et al. | |
| 2011/0087648 | A1 * | 4/2011 | Wang et al. | 707/709 |
| 2011/0167108 | A1 | 7/2011 | Chen et al. | |

* cited by examiner

Primary Examiner — Hares Jami
(74) Attorney, Agent, or Firm — Fish & Richardson P.C.

(57) ABSTRACT

Methods, systems, and apparatus, including computer programs encoded on a computer storage medium, for detecting compromised resources. In one aspect, a method includes receiving a resource; determining the resource is tainted based on one or more indications that the resource has been compromised; merging the tainted resource with previous versions of the resource that were tainted to generate a most recent tainted resource; determining the tainted resource is compromised by analyzing attributes of the most recent tainted resource that satisfy one or more threshold criteria that indicate the resource has been compromised; and identifying the tainted resource as compromised.

26 Claims, 7 Drawing Sheets

DETECTING COMPROMISED RESOURCES

CROSS REFERENCE TO RELATED APPLICATIONS

This application is a non-provisional of and claims priority to U.S. Provisional Patent Application No. 61/570,802, filed on Dec. 14, 2011, the entire contents of which are hereby incorporated by reference.

BACKGROUND

This specification relates to detecting compromised resources.

Internet search engines aim to identify resources (e.g., web pages, images, text documents, multimedia context) that are relevant to a user's needs and to present information about the resources in a manner that is most useful to the user. Internet search engines return a set of search results in response to a user submitted query.

Resources can be modified by third parties without permission. For example, a third party can replace original content of the resource with spam content. These resources can be referred to as compromised or defaced resources. A search result to a defaced resource may be less relevant to a user's needs.

SUMMARY

This specification describes technologies relating to detecting compromised resources.

The system described can detect a modified resource by applying the resource to three stages. First, the system extracts signals from the resource to determine whether the resource may be impermissibly modified. Second, the system merges the resource with selected previous versions of the resource. Third, the system compares a most recent version of the resource to one or more threshold criteria, which indicate the resource may have been impermissibly modified. If the resource satisfies the one or more thresholds, the system determines that the resource is compromised.

In general, one innovative aspect of the subject matter described in this specification can be embodied in methods that include the actions of receiving a resource; determining the resource is tainted based on one or more indications that the resource has been compromised; merging the tainted resource with previous versions of the resource that were tainted to generate a most recent tainted resource; determining the tainted resource is compromised by analyzing attributes of the most recent tainted resource that satisfy one or more threshold criteria that indicate the resource has been compromised; and identifying the tainted resource as compromised. Other embodiments of this aspect include corresponding systems, apparatus, and computer programs, configured to perform the actions of the methods, encoded on computer storage devices.

These and other embodiments can each optionally include one or more of the following features. Receiving a second resource; determining the second resource is tainted based on one or more indications that the second resource has been compromised; merging the second tainted resource with previous versions of the second resource that were tainted to create a most recent second tainted resource, wherein all previous versions of the second resource are tainted; and discarding the second tainted resource. Receiving a second resource; determining the second resource is untainted based on one or more indications that the second resource has not been compromised; merging the second untainted resource with previous versions of the second resource that were untainted to create a most recent second untainted resource, wherein all previous versions of the second resource are untainted; and discarding the second untainted resource.

These and other embodiments can each optionally include one or more of the following additional features. Adding the tainted resource identified as being compromised to a list of compromised resources. The previous untainted version of the resource can exist longer than a predetermined time after an initial index date. The most recent second tainted resource can be a web page, the web page having spam words in the Uniform Resource Locator of the web page. The most recent second tainted resource can have user generated content. The resource can be a web page, wherein the one or more indications that the resource has been compromised include one or more parameters selected from a number of words in a title of the page, metadata, content of the page, location of words on the page, repeated percentage of words, forward links on the page, content of pages the forward links points to, back links on the page, content of pages the back links point from, existence of user generated content, domain type, or language of the page. The one or more threshold criteria can be based on the one or more indications that the resource has been compromised. The resource can include a web page, image, text document, or multimedia.

In general, another aspect of the subject matter described in this specification can be embodied in methods that include the actions of receiving a resource; determining the resource is tainted based on one or more indications that the resource has been compromised, the resource being medically related; merging the tainted resource with previous versions of the resource that were tainted to create a most recent tainted resource; merging previous versions of the resource that were untainted to create a most recent untainted resource; determining the tainted resource is compromised by analyzing differences between the most recent untainted resource and the most recent tainted resource that satisfy one or more threshold criteria that indicate the resource has been compromised; and identifying the tainted resource as compromised.

In general, another aspect of the subject matter described in this specification can be embodied in methods that include the actions of receiving a search query; obtaining a plurality of search results responsive to the search query; determining that a first search result in the plurality of search results identifies a resource that exists in a collection of compromised resources; and identifying the first search result as being potentially compromised.

These and other embodiments can each optionally include one or more of the following additional features. Providing one or more search results, wherein the first search result includes a warning message indicating that the resource is potentially compromised. Sending a notification to a manager of the resource, wherein the notification indicates the resource is compromised Particular embodiments of the subject matter described in this specification can be implemented so as to realize one or more of the following advantages. The system can automatically identify a resource as modified. The system can extract numerous signals from the resource to determine the likelihood that a given resource has been modified. Another advantage is that the system can consider multiple previous versions of the resource to increase the accuracy of identifying whether the resource is modified. Yet another advantage is that the system can accurately detect modifications of various types of resources including educational or governmental web pages. Because some resources may be impermissibly modified to include unwanted terms, the system can accurately detect a modification even if the original unmodified resource includes terms similar to the unwanted terms. The unwanted terms may include, for instance, medical terms, or others terms concerning pornography or other products. Furthermore, the owner of the resource does not have to monitor the resource because the system can notify the owners if the resource is modified. Yet another advantage is that the system can include an interstitial warning about the modified resource to those that wish to access the modified resource. For example, if a search engine implements the system to warn users of compromised web pages in search results, this warning allows users to avoid selecting the compromised web pages that are returned as search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
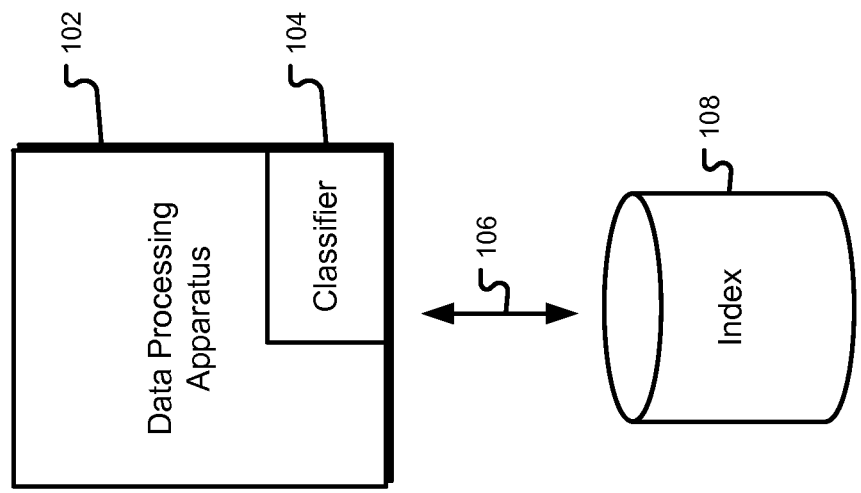
FIG. 1 is a schematic illustration of an example system that detects compromised resources.

FIG. 1 is a schematic illustration of an example system 100 that detects compromised resources. The resources can include, for example, web pages, images, text documents, or multimedia context. The system 100 includes a data processing apparatus 102 and an index 108. The data processing apparatus 102 and index 108 can communicate with each other through a network 106. In some implementations, data processing apparatus 102 are servers e.g., rack-mounted servers or other computing devices. The servers can be in the same physical location (e.g., data center) or they can be in different physical locations. The servers can have different capabilities and computer architectures.

The data processing apparatus 102 includes a classifier 104. The classifier 104 can detect resources that have been compromised, in particular, compromised web pages, as will be further described below. The index 108 can be a database created by crawling web resources, which the classifier 104 processes to identify uncompromised resources. The index 108 can also be stored across multiple databases. In some implementations, the index 108 stores web pages, representations of web pages, or references to web pages identified as being untainted or uncompromised. In some implementations, the index 108 stores multiple versions of resources. In some implementations, multiple versions of resources are stored in a separate database or index. Newly retrieved (e.g., crawled) resources identified as potentially being compromised can be compared with a corresponding untainted or tainted version in the index 108. A newly retrieved resource can be a candidate compromised resource, which can be designated as either untainted or tainted. An untainted version of the resource is one which the system believes has not been compromised. A tainted version of the resource is one which the system believes may have been compromised. For example, for a web page, the system compares a candidate compromised web page to untainted or tainted versions of the web page that are stored in the index. Also, the index 108 can be stored in an electronic file system, a distributed file system or other network-accessible persistent storage which can store information on computer-readable storage media.

Figure 2:
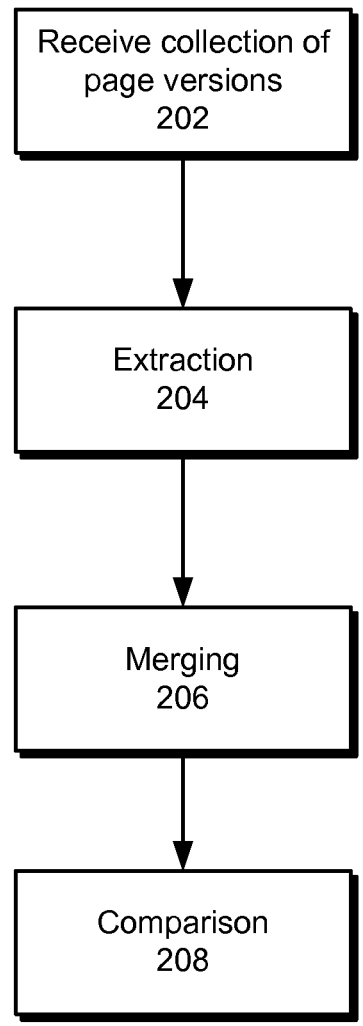
FIG. 2 is a flow chart illustrating example method for detecting compromised resources.

FIG. 2 is a flow chart illustrating example method 200 for detecting compromised resources. For convenience, the method 200 will be described with respect to a system having one or more computing devices that performs the method 200. For example, the system can be the system 100 described with respect to FIG. 1. In other words, the system can determine whether a candidate compromised resource is compromised by applying the method 200. The compromised resource can be, for example, a compromised web page. A page can be considered compromised if original content on the page has been replaced by a third party with unauthorized content. An example of a compromised web page can include a web page, e.g., a university's home page, whose content was impermissibly modified (or "hacked") to display links to commercial sites offering to sell prescription drugs or other products. For convenience, the method will be described with respect to a web page resource.

To determine whether a candidate compromised version of a page is compromised, the system receives a collection of page versions 202 corresponding to the page. The collection of page versions can represent or include multiple versions of the page that have been indexed over time and also includes the candidate compromised page. The collection can be received from various sources including an index of Internet web pages or an external database. After receiving the collection of page versions, the system can use a classifier to ultimately determine whether the candidate compromised version of the page has been compromised. The classifier processes the collection of page versions in 3 stages: 1) extraction 204, 2) merging 206, and 3) comparison 208. The extraction stage will be described with respect to FIG. 3. The merging stage will be described with respect to FIG. 4. The comparison stage will be described with respect to FIG. 5.

Figure 3:
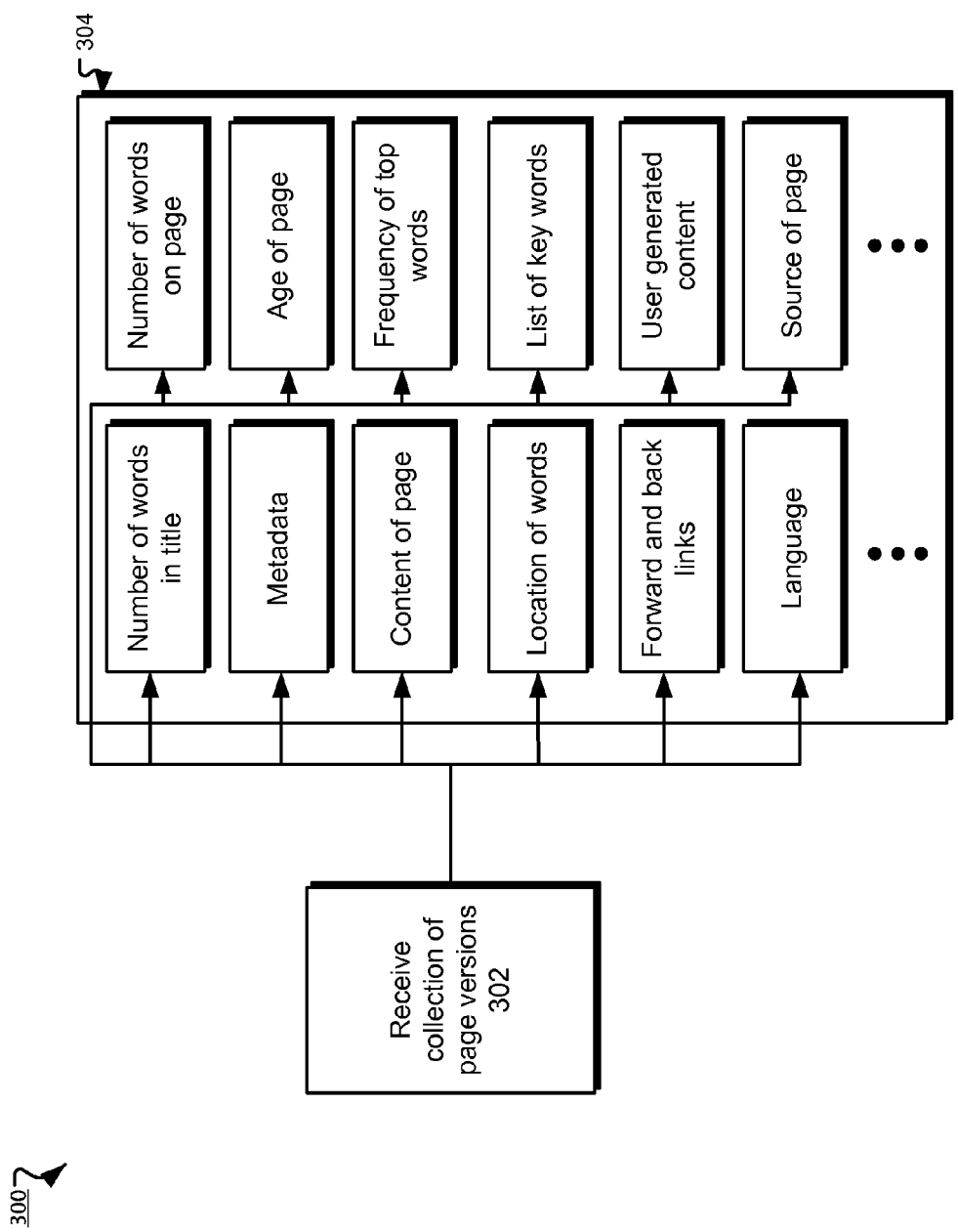
FIG. 3 is a diagram illustrating an example extraction stage of a classifier.

FIG. 3 is a diagram illustrating an example extraction stage 300 of the classifier. As mentioned above, the system receives a collection of page versions 302 and inputs it into a classifier 304. The system categorizes each page version, including the candidate compromised page, as belonging to either untainted or tainted categories. An 'untainted' designation indicates the page has not been compromised. A 'tainted' designation indicates the page may or may not be compromised, signaling the classifier to perform additional operations to determine whether the page has been compromised as will be further described below. Additionally, a third category or, alternatively, a sub-category of untainted can include untainted educational as will be further described below. Other categories or sub-categories can include government pages, organizational pages, or any other pages that are commonly targeted by hackers.

The system extracts signals from each page. These extracted signals can include information about potential spam words and potential spam backlinks. Spam words can, for instance, include particular words or phrases that are commonly associated with spam or other unwanted content. In some implementations, spam words can include the names of prescription drugs that are usually targeted by spammers, for example, to promote unauthorized prescription drug sales. An example of an extracted signal can be a number of identified spam words. Another example of an extracted signal can be a number of spam backlinks. Spam backlinks can be, for instance, incoming links to each page, where the incoming links are from other pages commonly associated with spam content.

These signals can be used to categorize the page as untainted or tainted. The number of spam words in the page can be determined by searching the title, content, and metadata of the page. In some implementations, a list of spam words is retrieved from a database. The system then compares the words from the list of spam words to the words in the page. Even if some words in the page match some words from the list of spam words, the page may not be considered tainted. The system can still consider whether the number of matches satisfies one or more threshold criteria as will be further described below.

A page can be categorized as untainted if it contains fewer spam words than a threshold of a number of spam words in the page. The threshold can be any suitable value, e.g., 1, 5, 10, 50, 100, 500, or 1000 . . . . A page can also be categorized as untainted if it contains fewer spam backlinks than a threshold of a number of spam backlinks in the page. The threshold can be any suitable value, e.g., 1, 5, 10, 50, 100, 500, or 1000. In some implementations, spam backlinks of a page are incoming links to the page from pages that mention names of prescription drugs or other spam words. The system can also consider signals including the actual content of the page, the location of spam words in the page, the language of the page, forward links (i.e., links on the page that point to another page), age of the page, source of the page, frequency of top keywords, or user generated content (e.g., forum comments or blog comments).

A page can be classified as tainted if it satisfies certain thresholds, e.g., whether there are a threshold number of spam words in the page or a threshold number of spam backlinks. Both thresholds can be any suitable value, e.g., 1, 5, 10, 50, 100, 500, or 1000. In some embodiments, additional categories or sub-categories can be considered or evaluated. For instance, the category of educational untainted can include pages with an .edu domain that do not have spam words in the page, but may have some spam backlinks pointing to the page. While most hacked pages are edited by site administrators to remove unwanted third-party content such as spam words, backlinks containing spam can still remain pointing to the pages. Therefore, creating an additional category for "educational untainted" sites can increase the accuracy of identifying compromised resources. In some alternative implementations, to increase accuracy, the system can consider or evaluate additional categories similar to the "educational untainted" category, e.g., categories for pages having a .gov domain, .org domain, or other domains that have historically been highly targeted by hackers.

Figure 4:
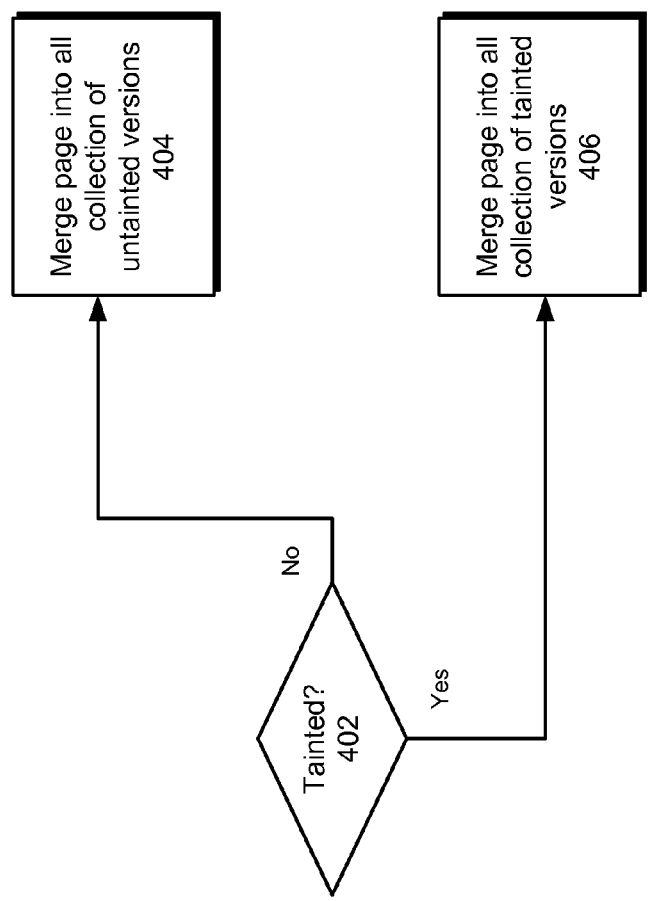
FIG. 4 is a diagram illustrating an example merging stage of a classifier.

FIG. 4 is a diagram illustrating an example merging stage 400 of the classifier. In some implementations, previous versions of the page may be either untainted or tainted. Some versions may be duplicates of each other while other versions may have only slight variations of each other. For each page in the collection of page versions, whether a duplicate or a variant, the system categorizes the page as untainted or tainted 402. After categorizing each page version based on the signals described above, the system merges pages of the same category together. In some implementations, the system merges representations of, or references to, pages. By merging references, the system can remove references pointing to a duplicate page. The system creates a collection of untainted pages and merges each page, or each reference to a page, categorized as untainted into the collection of untainted pages 404. Similarly, the system also creates a collection of tainted pages and merges each page, or each reference to a page, categorized as tainted into the collection of tainted pages 406.

In some implementations, following the merge, the system retains the most recent untainted page from the collection of untainted pages. The classifier then inputs the most recent untainted page and the candidate compromised page (which can be designated as untainted or tainted) to the comparison stage. In some implementations, there will only be a merged collection of untainted pages and no merged collection of tainted pages. In this case, the classifier will skip the rest of the process because the candidate compromised page is untainted and has not been compromised. In some implementations, there will only be a merged collection of tainted pages and no merged collection of untainted pages. In this case, the classifier will also skip the rest of the process because the candidate compromised page, although tainted, has not been compromised. Because this page has never been untainted, the page has always contained spam and has not been compromised from an untainted version.

Figure 5:
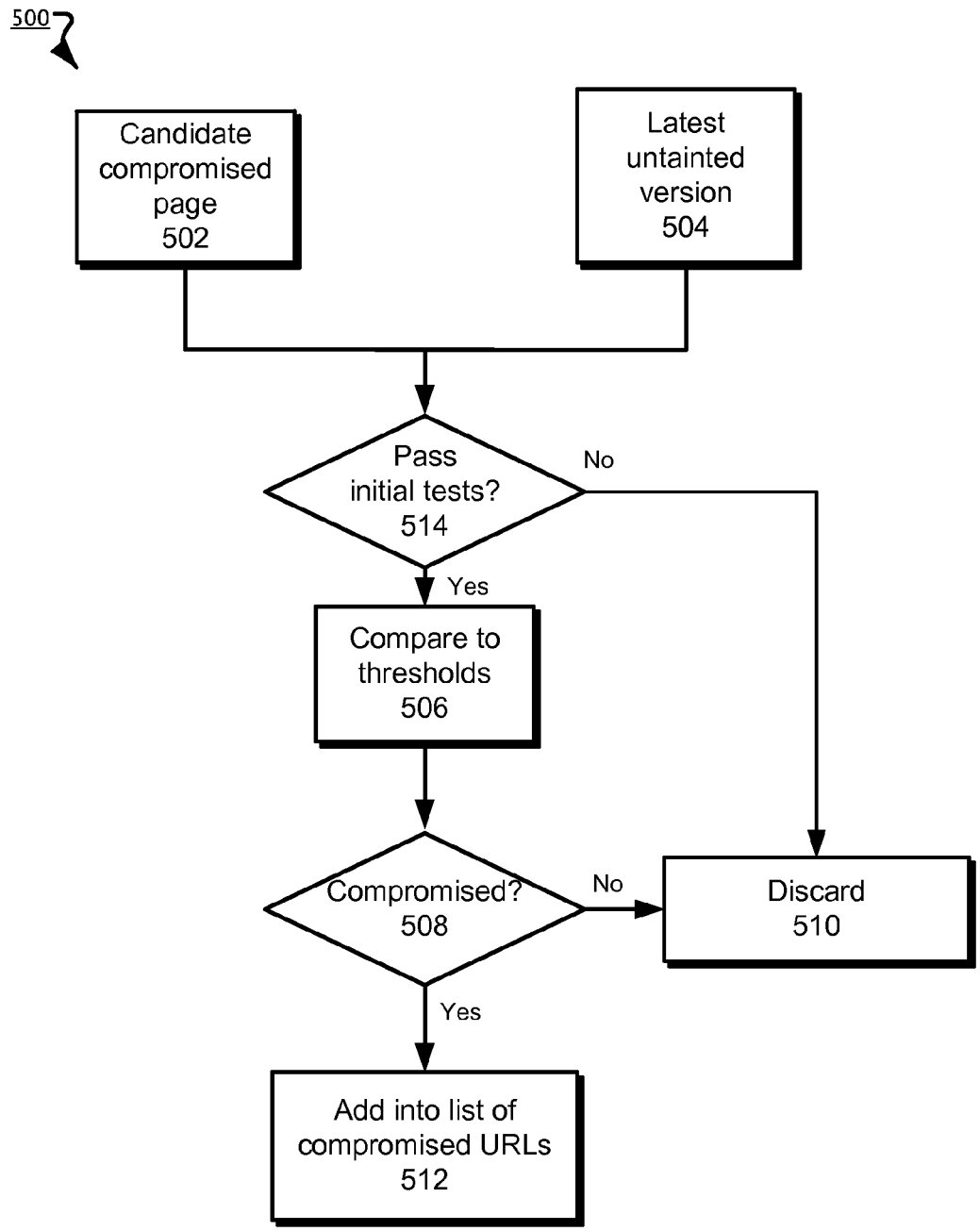
FIG. 5 is a diagram illustrating an example comparison stage of a classifier.

FIG. 5 is a diagram illustrating an example comparison stage 500 of the classifier. The classifier first subjects the candidate compromised page to a series of tests 514. If the page passes the tests, the classifier continues to compare the page to various thresholds. If the page does not pass the series of tests, the page can be discarded 510. A discarded page is determined to not be compromised, but it maintains its designation as tainted in the index. For example, if the number of spam words in the page's Uniform Resource Locator (URL) reaches a threshold, the page can be discarded. The system discards this type of page because URLs can, in some instances, be more difficult to compromise. Therefore, if a page has a URL with spam words, the owner of the page may have approved the URL and the page was less likely to have been compromised.

In another example, if the spam words appear as user generated content, the page may be discarded. User generated content may appear on blogs, guest books, forums, or any other type of page that allows user input. In some embodiments, the system can discard this type of page because spam words in the form of user generated content are less indicative that the page has been compromised. The system may, for instance, assume the owner of the page intentionally provided Internet users the ability to add content onto the page, even if the content contains spam words.

In some embodiments, if the date of the most recent version of the page and the date of the first indexed version of the page are both within a threshold period of time, the page can be discarded. In some implementations, this threshold time period can be a day, 48 hours, a week, three weeks, five weeks, two months, or six months. The system may discard this type of page because the page has too few previous versions to compare to.

In some implementations, a spam word may be considered ambiguous if it can represent a person's name or other proper noun. In this case, pages with spam words that may be confused for a person's name or other proper nouns can be discarded. In an effort to minimize false alarms, the system may err on the side of caution when identifying candidate compromised pages as compromised.

After a page passes initial tests 514, the classifier compares the candidate compromised page 502 to numerous thresholds 506. In some implementations, the latest untainted version 504 can be used when the candidate compromised page 502 can be a page having unwanted terms. For example, the page can be a medical page. In some alternative implementations, the candidate compromised page 502 includes other content. To pass initial tests, the classifier computes the total number of spam words on the page. In some implementations, this includes computing the total number of spam words in the title, content, forward links, backlinks, and metadata of the page. The classifier then compares the number of spam words in each category to specified thresholds for each category. For example, the threshold for the number of spam words in a page that a backlink points from can be any suitable value, e.g. under 5 words, under 10 words, under 30 words, under 100 words, under 300 words, or under many more words, e.g., 1000 . . . . Generally, if all thresholds are met, the page can be identified as compromised. In some implementations, if some, but not all, of the thresholds are met, the page may not be identified as compromised and can be discarded. Individual thresholds may be increased or decreased to modify sensitivity of the classifier.

In some implementations, some exceptions may apply that may prevent the page from being identified as compromised 508 even though all thresholds are met. For example, the page may be a medical page that contains the names of drugs that are commonly classified as spam words. In another example, the page may be a page discussing various products that contains terms referencing those products that might, in some contexts, be considered spam words.

To avoid falsely classifying these pages as spam, the classifier performs additional comparisons to increase accuracy. The classifier computes a count of the most frequent words on the untainted and candidate compromised versions of the page. Then, the classifier compares these counts to compute a percentage of top words that appear in both the untainted and candidate compromised versions of the page. If the percentage exceeds a specified threshold, the page will not be identified as compromised. If the percentage does not satisfy a specified threshold, the page can be identified as compromised. In some implementations, the existence of spam words in the title of the page may be an exception, even if all thresholds are met. For example, if the percentage is below a specified threshold but spam words do not occur in the title, the page may not be identified as compromised. The specified threshold percentages can be any suitable value such as 5%, 10%, 25%, 35%, or 50%. In some implementations, if spam words occur in the title, the page can be identified as compromised.

In some implementations, an untainted page may have been previously identified as compromised. This may happen because the owner of the page submitted a reconsideration request, and the page was manually determined to be untainted. In this case, the classifier compares the page to the previous version of the page that was manually determined to be untainted. In some implementations, if a particular page reaches a threshold of search impressions and is determined to be compromised, the page is marked for manual review and not automatically determined to be compromised. For example, a search impression threshold can be 1,000, 10,000, 100,000, or 1,000,000 views. After a page is identified as compromised 508, the page is added to a list of compromised URLs 512. In some implementations, this list is stored in network storage. In some implementations, the list can be universally accessed by other data processing apparatus within the network. In some implementations, the system can send a notification to the owner of the page's site indicating the page has been identified as compromised.

Figure 6:
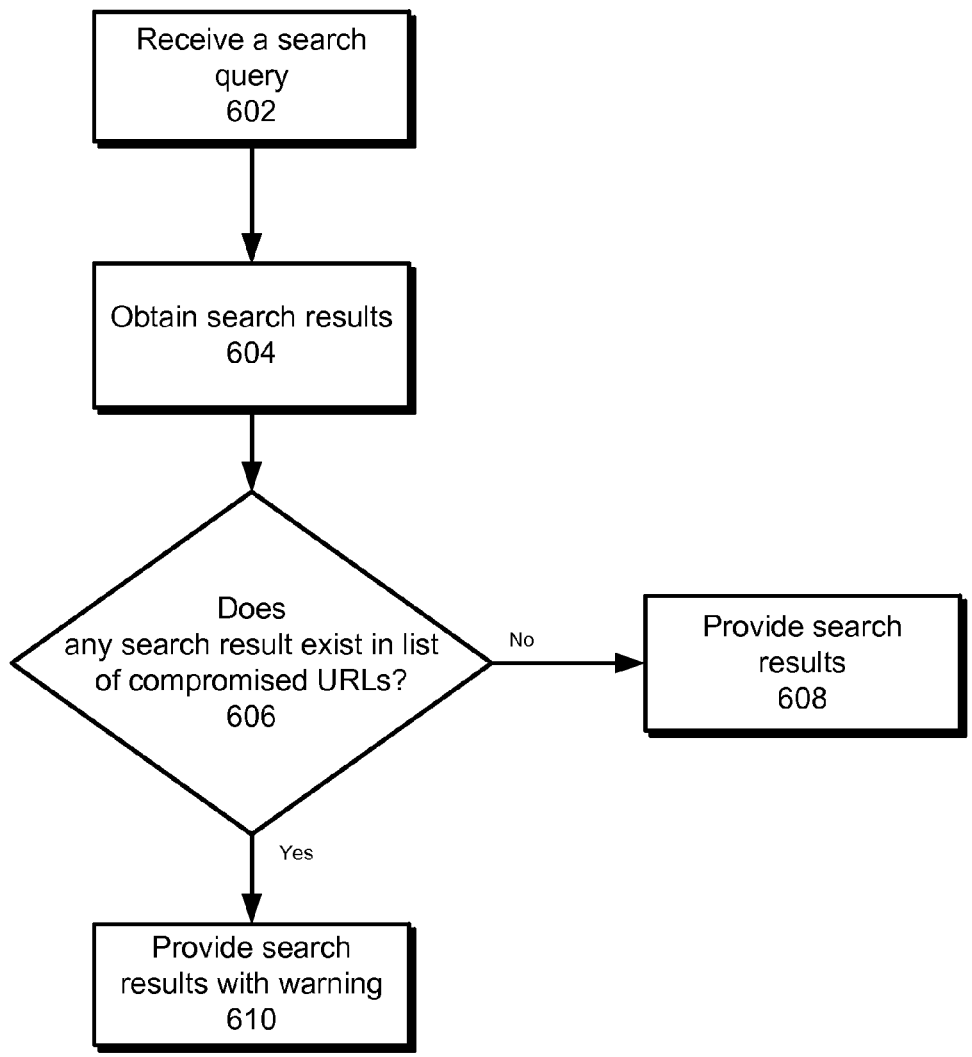
FIG. 6 is a flow chart showing an example process for identifying compromised search results.

FIG. 6 is a flow chart showing an example method 600 for identifying compromised search results. For convenience, the method 600 will be described with respect to a system having one or more computing devices that performs the method 600. For example, the system can be a data processing apparatus that processes search queries.

The system receives a search query 602. For example, the search query can be received from a user through a search interface provided by the system and displayed on a user device. For example, the user device can include a browser that presents a search field for inputting search queries.

The system obtains search results 604 responsive to the received search query. The search results identify resources responsive to the query and can include URLs corresponding to the respective resources. The system checks whether each search result exists in a list of compromised URLs 606. The list of compromised URLs can include URLs determined to be compromised as described above with respect to FIGS. 2-5. If none of the search results exist in the list of compromised URLs, the system provides the search results to the user for display 608. The search results can be displayed as an ordered list of results. Each result can include a link to the corresponding resource as well as additional information about the resource. If a search result exists in the list of compromised URLs, the system can include a warning corresponding to the compromised search result when providing the search results 610. In particular, the warning can be included with the corresponding search result for display. In some implementations, the warning reads "This page may have been compromised."

Figure 7:
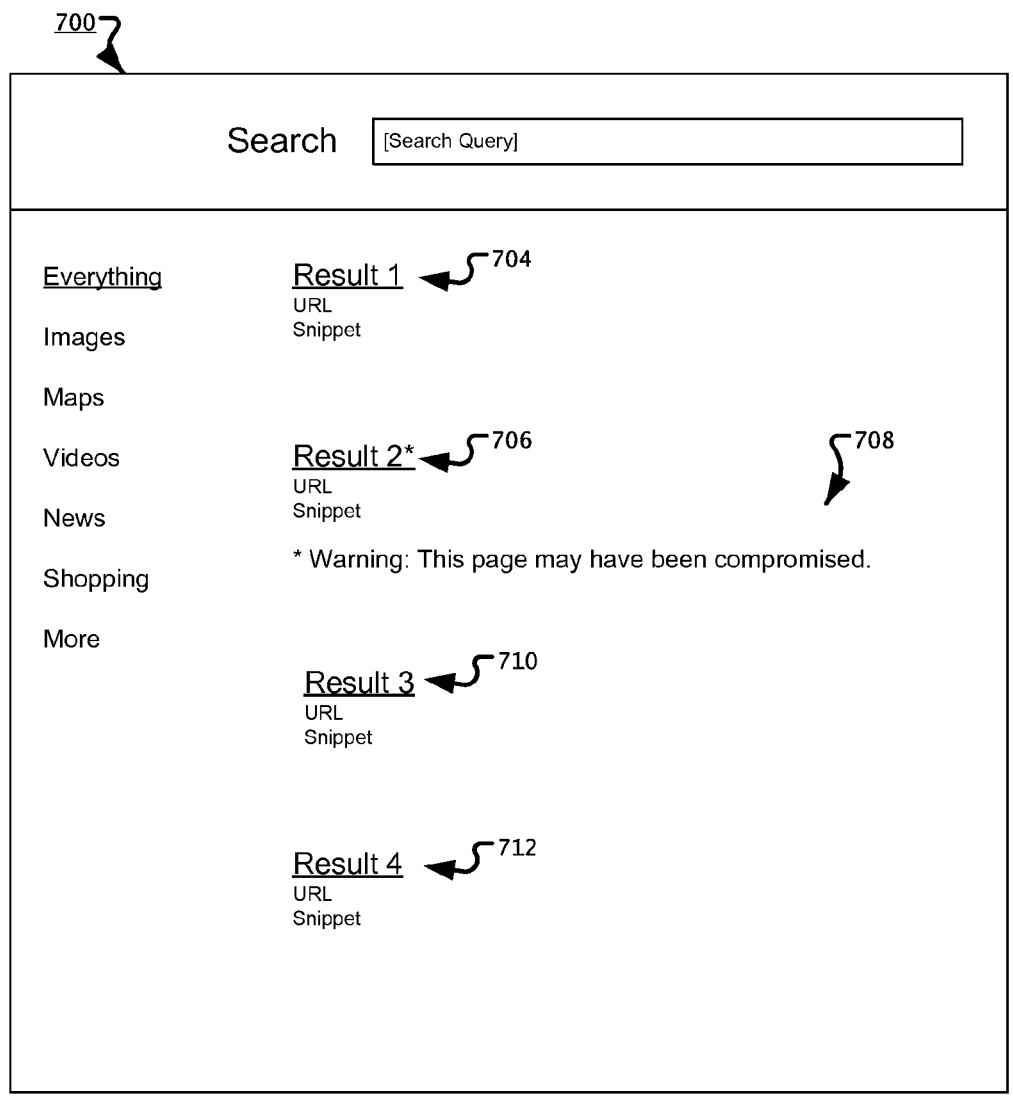
FIG. 7 is a diagram showing an example search results page including a warning displayed within search results.

FIG. 7 is a diagram showing an example search results page 700 including a warning displayed within search results. The search results page 700 can be presented on a client device, e.g., using a browser, based on search results provided by a search system. The search results can be provided in response to a submitted query. The search results page 700 includes search results 704, 706, 710, and 712. Search results Result 1 704, Result 3 710, and Result 4 712 are not identified as compromised. However, search result (Result 2) 706 has been identified as compromised, e.g., as described above with respect to FIGS. 1-6. For the compromised result, the search results page 700 includes a warning 708. In particular, the warning is presented with the compromised search result. For example, the warning reads "Warning: this page may have been compromised" and is presented immediately below the search result. In some other implementations, the warning can be presented in different forms, for example, using a different location relative to the compromised search result, different warning text, or with different visual effects, e.g., highlighting or other visual cues.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   obtaining a current version of a resource and a collection of previous versions of the resource, each previous version having been classified as either (i) indicating that the resource is uncompromised, or (ii) indicating that the resource is a candidate for being identified as compromised, wherein a given resource is identified as compromised if original content of the given resource has been replaced by a third party with unauthorized content;
   determining, based on content extracted from the current version of the resource, whether the current version of the resource is to be classified as (i) indicating that the resource is uncompromised, or (ii) indicating that the resource is a candidate for being identified as compromised; storing the current version of the resource with an indication of the determined classification of the current version of the resource;
   in response to determining that the current version of the resource is to be classified as (ii) indicating that the resource is a candidate for being identified as compromised:
     identifying (i) a set of top keywords occurring in the current version of the resource, and (ii) a set of top keywords occurring in a most recent one of the previous versions of the resource having been classified as indicating that the resource is a candidate for being identified as compromised;
     comparing (i) the set of top keywords occurring in the current version of the resource, and (ii) the set of top keywords occurring in the most recent one of the previous versions of the resource having been classified as indicating that the resource is a candidate for being identified as compromised;
     determining whether the resource is to be identified as compromised, based at least on the results of the comparison; and
     providing, while maintaining the determined classification of the current version of the resource and based on determining whether the resource is to be identified as compromised, an indication of whether the resource is compromised.

2. The method of claim 1, further comprising, in response to determining that the current version of the resource is to be classified as indicating that the resource is a candidate for being identified as compromised:
   determining whether the entire collection of previous versions of the resource is classified as indicating that the resource is a candidate for being identified as compromised; and
   wherein determining whether the resource is to be identified as compromised comprises:
     determining whether the resource is to be identified as compromised based at least on determining whether the entire collection of previous versions of the resource is classified as indicating that the resource is a candidate for being identified as compromised.

3. The method of claim 1, wherein, in response to determining that the resource is to be identified as compromised, providing the indication of whether the resource is compromised further comprises:
   adding an identifier that corresponds to the resource to a list of identifiers corresponding to compromised resources.

4. The method of claim 1, wherein the resource includes a web page, image, text document, or multimedia.

5. The method of claim 2, comprising, in response to determining that the entire collection of previous versions of the resource is classified as indicating that the resource is a candidate for being identified as compromised:
   determining that the resource is not to be identified as compromised.

6. The method of claim 3, comprising:
   identifying a Uniform Resource Locator that corresponds to the resource, and
   wherein, in response to determining that the resource is to be identified as compromised, adding the identifier that corresponds to the resource to the list of identifiers corresponding to compromised resources further comprises:
     adding the Uniform Resource Locator that corresponds to the resource to a list of Uniform Resource Locators corresponding to compromised resources.

7. The method of claim 6, wherein the list is referenced by a search engine in response to a search query.

8. The method of claim 1, wherein storing the current version of the resource with the indication of the determined classification of the current version of the resource comprises:
   storing, in a search engine index, the current version of the resource with the indication of the determined classification of the current version of the resource.

9. The method of claim 1, wherein storing the current version of the resource with the indication of the determined classification of the current version of the resource further comprises:
identifying, from among the collection of previous versions of the resource, a particular set of previous versions of the resource that each have a classification matching the determined classification of the current version of the resource; and
merging the current version of the resource with the particular set of previous versions of the resource.

10. The method of claim 1, wherein resources that are candidates for being identified as compromised are those that are potentially compromised.

11. The method of claim 1, wherein the resource includes medically related content.

12. A method performed by data processing apparatus, the method comprising:
obtaining a current version of a resource and a collection of previous versions of the resource, each previous version having been classified as either (i) indicating that the resource is uncompromised, or (ii) indicating that the resource is a candidate for being identified as compromised, wherein a given resource is identified as compromised if original content of the given resource has been replaced by a third party with unauthorized content;
determining, based on content extracted from the current version of the resource, whether the current version of the resource is to be classified as (i) indicating that the resource is uncompromised, or (ii) indicating that the resource is a candidate for being identified as compromised;
storing the current version of the resource with an indication of the determined classification of the current version of the resource; and
in response to determining that the current version of the resource is to be classified as (ii) indicating that the resource is a candidate for being identified as compromised:
determining whether the resource is compromised, wherein the determining comprises:
applying a series of one or more tests to the current version of the resource, wherein in response to the current version of the resource failing the series of one or more tests, the resource is determined to not be compromised but the current version of the resource maintains the classification as (ii) indicating that the resource is a candidate for being identified as compromised;
in response to the current version of the resource passing the series of one or more tests, comparing content of the current version of the resource to one or more thresholds relative to corresponding content of a most recent one of the previous versions of the resource having been classified as indicating that the resource is uncompromised to determine whether the resource is compromised.

13. The method of claim 12, comprising:
determining whether the current version of the resource includes a quantity of spam words that exceeds a first threshold;
wherein determining, based on content extracted from the current version of the resource, whether the current version of the resource is to be classified as (i) indicating that the resource is uncompromised, or (ii) indicating that the resource is a candidate for being identified as compromised, comprises:
determining, based on determining whether the current version of the resource includes a quantity of spam words that exceeds a predetermined threshold, whether the current version of the resource is to be classified as (i) indicating that the resource is uncompromised, or (ii) indicating that the resource is a candidate for being identified as compromised.

14. The method of claim 13, wherein applying the series of one or more tests to the current version of the resource includes:
determining whether a Uniform Resource Locator that corresponds to the resource includes a quantity of spam words that exceeds a second threshold;
wherein in response to determining that the Uniform Resource Locator that corresponds to the resource includes a quantity of spam words that exceeds the second threshold, the resource is determined to not be compromised but the current version of the resource maintains the classification as indicating that the resource is a candidate for being identified as compromised.

15. The method of claim 13, wherein applying the series of one or more tests to the current version of the resource includes:
determining whether user-generated content occurring in the current version of the resource includes a quantity of spam words that exceeds a second threshold;
wherein in response to determining that the user-generated content occurring in the current version of the resource includes a quantity of spam words that exceeds the second threshold, the resource is determined to not be compromised but the current version of the resource maintains the classification as indicating that the resource is a candidate for being identified as compromised.

16. A system comprising:
a processor; and
one or more computer-readable storage media coupled to the processor and having instructions stored thereon, which, when executed by the processor, cause the processor to perform operations comprising:
obtaining a current version of a resource and a collection of previous versions of the resource, each previous version having been classified as either (i) indicating that the resource is uncompromised, or (ii) indicating that the resource is a candidate for being identified as compromised, wherein a given resource is identified as compromised if original content of the given resource has been replaced by a third party with unauthorized content;
determining, based on content extracted from the current version of the resource, whether the current version of the resource is to be classified as (i) indicating that the resource is uncompromised, or (ii) indicating that the resource is a candidate for being identified as compromised; storing the current version of the resource with an indication of the determined classification of the current version of the resource;
in response to determining that the current version of the resource is to be classified as (ii) indicating that the resource is a candidate for being identified as compromised:
identifying (i) a set of top keywords occurring in the current version of the resource, and (ii) a set of top keywords occurring in a most recent one of the previous versions of the resource having been classified as indicating that the resource is a candidate for being identified as compromised;

comparing (i) the set of top keywords occurring in the current version of the resource, and (ii) the set of top keywords occurring in the most recent one of the previous versions of the resource having been classified as indicating that the resource is a candidate for being identified as compromised;

determining whether the resource is to be identified as compromised, based at least on the results of the comparison; and providing, while maintaining the determined classification of the current version of the resource and based on determining whether the resource is to be identified as compromised, an indication of whether the resource is compromised.

17. The system of claim 16, wherein, in response to determining that the current version of the resource is to be classified as indicating that the resource is a candidate for being identified as compromised, the operations comprise:

determining whether the entire collection of previous versions of the resource is classified as indicating that the resource is a candidate for being identified as compromised; and wherein determining whether the resource is to be identified as compromised comprises:

determining whether the resource is to be identified as compromised based at least on determining whether the entire collection of previous versions of the resource is classified as indicating that the resource is a candidate for being identified as compromised.

18. The system of claim 17, wherein, in response to determining that the entire collection of previous versions of the resource is classified as indicating that the resource is a candidate for being identified as compromised, the operations comprise:

determining that the resource is not to be identified as compromised.

19. The system of claim 16, wherein, in response to determining that the resource is to be identified as compromised, providing the indication of whether the resource is compromised, the operations comprise:

adding an identifier that corresponds to the resource to a list of identifiers corresponding to compromised resources.

20. The system of claim 19, wherein the operations comprise:

identifying a Uniform Resource Locator that corresponds to the resource, and wherein, in response to determining that the resource is to be identified as compromised, adding the identifier that corresponds to the resource to the list of identifiers corresponding to compromised resources further comprises:

adding the Uniform Resource Locator that corresponds to the resource to a list of Uniform Resource Locators corresponding to compromised resources.

21. The system of claim 20, wherein the list is referenced by a search engine in response to a search query.

22. The system of claim 16, wherein storing the current version of the resource with the indication of the determined classification of the current version of the resource comprises:

storing, in a search engine index, the current version of the resource with the indication of the determined classification of the current version of the resource.

23. The system of claim 16, wherein storing the current version of the resource with the indication of the determined classification of the current version of the resource further comprises:

identifying, from among the collection of previous versions of the resource, a particular set of previous versions of the resource that each have a classification matching the determined classification of the current version of the resource; and merging the current version of the resource with the particular set of previous versions of the resource.

24. A system comprising:

a processor; and one or more computer-readable storage media coupled to the processor and having instructions stored thereon, which, when executed by the processor, cause the processor to perform operations comprising:

obtaining a current version of a resource and a collection of previous versions of the resource, each previous version having been classified as either (i) indicating that the resource is uncompromised, or (ii) indicating that the resource is a candidate for being identified as compromised, wherein a given resource is identified as compromised if original content of the given resource has been replaced by a third party with unauthorized content;

determining, based on content extracted from the current version of the resource, whether the current version of the resource is to be classified as (i) indicating that the resource is uncompromised, or (ii) indicating that the resource is a candidate for being identified as compromised;

storing the current version of the resource with an indication of the determined classification of the current version of the resource; and in response to determining that the current version of the resource is to be classified as (ii) indicating that the resource is a candidate for being identified as compromised:

determining whether the resource is compromised, wherein the determining comprises:

applying a series of one or more tests to the current version of the resource, wherein in response to the current version of the resource failing the series of one or more tests, the resource is determined to not be compromised but the current version of the resource maintains the classification as (ii) indicating that the resource is a candidate for being identified as compromised;

in response to the current version of the resource passing the series of one or more tests, comparing content of the current version of the resource to one or more thresholds relative to corresponding content of a most recent one of the previous versions of the resource having been classified as indicating that the resource is uncompromised to determine whether the resource is compromised.

25. A non-transitory computer-readable medium storing software comprising instructions executable by one or more computers which, upon such execution, cause the one or more computers to perform operations comprising:

obtaining a current version of a resource and a collection of previous versions of the resource, each previous version having been classified as either (i) indicating that the resource is uncompromised, or (ii) indicating that the resource is a candidate for being identified as compromised, wherein a given resource is identified as compromised if original content of the given resource has been replaced by a third party with unauthorized content;

determining, based on content extracted from the current version of the resource, whether the current version of the resource is to be classified as (i) indicating that the resource is uncompromised, or (ii) indicating that the resource is a candidate for being identified as compromised; storing the current version of the resource with an indication of the determined classification of the current version of the resource;

in response to determining that the current version of the resource is to be classified as (ii) indicating that the resource is a candidate for being identified as compromised:

identifying (i) a set of top keywords occurring in the current version of the resource, and (ii) a set of top keywords occurring in a most recent one of the previous versions of the resource having been classified as indicating that the resource is a candidate for being identified as compromised;

comparing (i) the set of top keywords occurring in the current version of the resource, and (ii) the set of top keywords occurring in the most recent one of the previous versions of the resource having been classified as indicating that the resource is a candidate for being identified as compromised;

determining whether the resource is to be identified as compromised, based at least on the results of the comparison; and providing, while maintaining the determined classification of the current version of the resource and based on determining whether the resource is to be identified as compromised, an indication of whether the resource is compromised.

26. A non-transitory computer-readable medium storing software comprising instructions executable by one or more computers which, upon such execution, cause the one or more computers to perform operations comprising:

obtaining a current version of a resource and a collection of previous versions of the resource, each previous version having been classified as either (i) indicating that the resource is uncompromised, or (ii) indicating that the resource is a candidate for being identified as compromised, wherein a given resource is identified as compromised if original content of the given resource has been replaced by a third party with unauthorized content;

determining, based on content extracted from the current version of the resource, whether the current version of the resource is to be classified as (i) indicating that the resource is uncompromised, or (ii) indicating that the resource is a candidate for being identified as compromised;

storing the current version of the resource with an indication of the determined classification of the current version of the resource; and in response to determining that the current version of the resource is to be classified as (ii) indicating that the resource is a candidate for being identified as compromised:

determining whether the resource is compromised, wherein the determining comprises:

applying a series of one or more tests to the current version of the resource, wherein in response to the current version of the resource failing the series of one or more tests, the resource is determined to not be compromised but the current version of the resource maintains the classification as (ii) indicating that the resource is a candidate for being identified as compromised;

in response to the current version of the resource passing the series of one or more tests, comparing content of the current version of the resource to one or more thresholds relative to corresponding content of a most recent one of the previous versions of the resource having been classified as indicating that the resource is uncompromised to determine whether the resource is compromised.

\* \* \* \* \*